Oct. 29, 1968    A. J. ZWICKY    3,408,123
RADIAL ROLLER BEARING
Filed Nov. 9, 1966    2 Sheets-Sheet 1
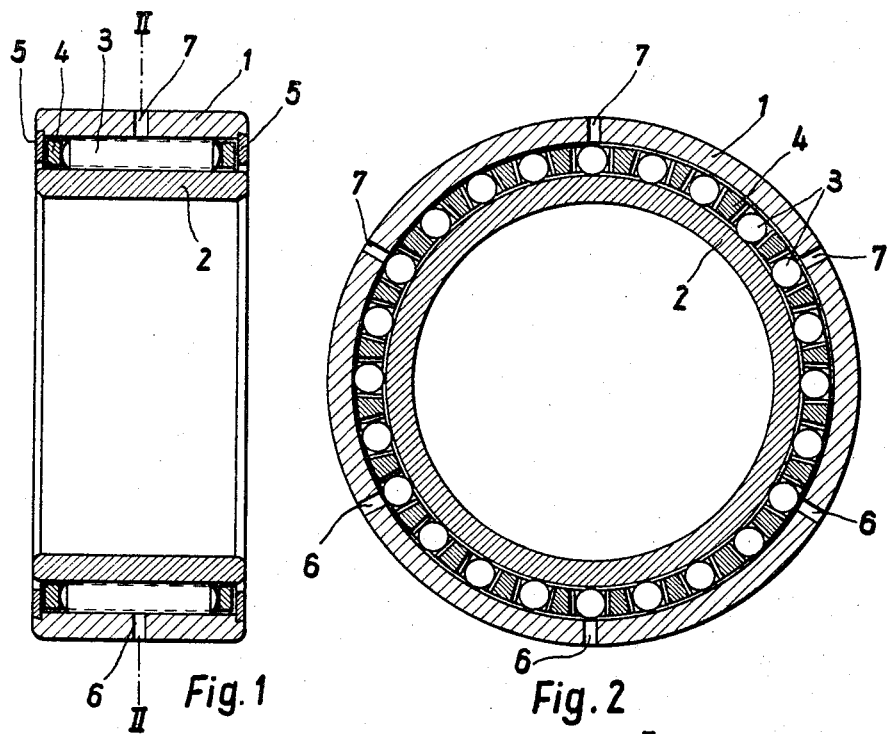
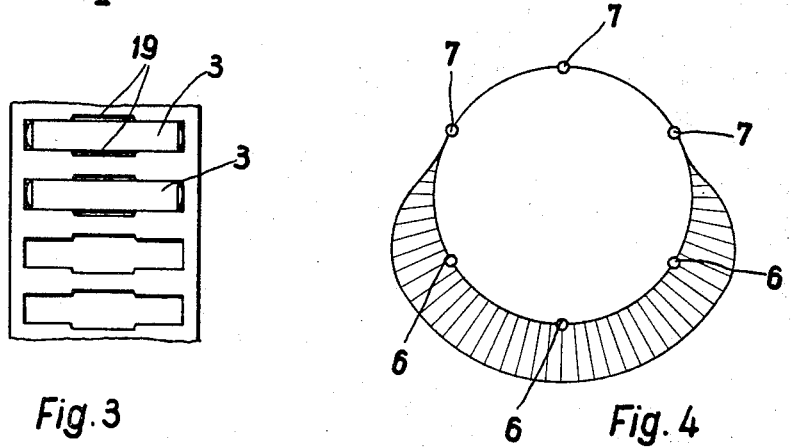
Inventor:
ALFRED JAKOB ZWICKY
BY Robert H. Jacob
AGT.

Oct. 29, 1968 A. J. ZWICKY 3,408,123
RADIAL ROLLER BEARING
Filed Nov. 9, 1966 2 Sheets-Sheet 2
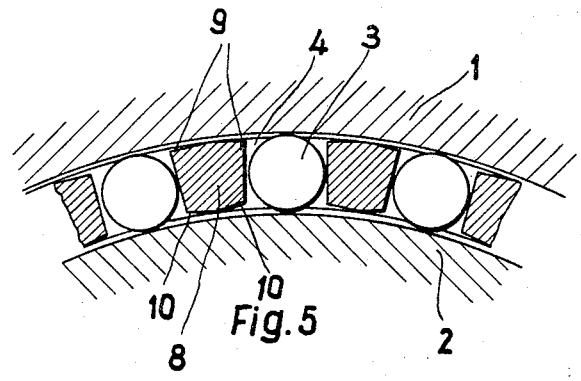
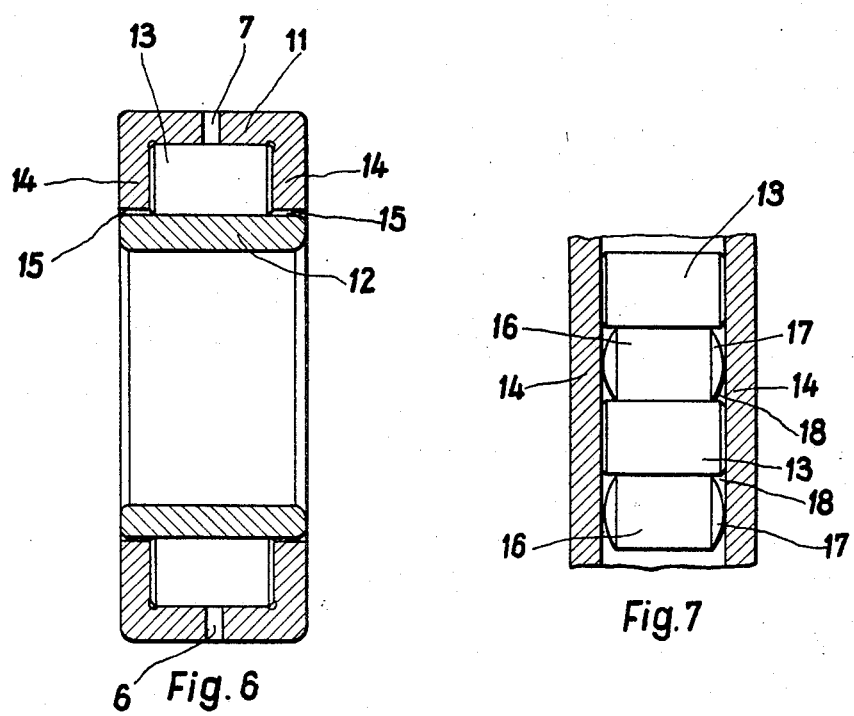
Inventor:
ALFRED JAKOB ZWICKY
BY [signature]
AGT.

3,408,123
RADIAL ROLLER BEARING
Alfred Jakob Zwicky, Villa Belsito, Rapperswil,
St. Gall, Switzerland
Filed Nov. 9, 1966, Ser. No. 593,071
Claims priority, application Germany, Nov. 11, 1965,
Z 11,870; May 6, 1966, Z 12,201
6 Claims. (Cl. 308—187)

The present invention relates to roller bearings and more particularly to radial roller bearings.

The roller bearing in accordance with the invention comprises a plurality of rollers which may either be accommodated in the pockets of a cage or which may also be disposed directly adjacent to one another without interposing a cage and roll between concentric race paths of adjacent components of the structure.

Roller bearings of this type have become known in many different forms of construction. The greatest permissible radial loads for such bearings depend on the one hand on the structural form of the bearing and on the other hand on the life span they are intended to endure. In many instances it is only possible, however, for reasons of space to build only bearings the wear of which does not meet the expected duration.

It is, therefore, an object of the invention to greatly increase the loading capacity or the endurance of such radial roller bearings, without at the same time increasing the outside or over-all dimensions and without essentially increasing the material and labor requirements and thereby the costs.

In accordance with the invention, it is proposed to accomplish this in that in a roller bearing where the rollers are accommodated in the pockets of a cage, the cage engages the spaces between the race paths with so little play or tolerance, that the individual pockets of the cage define self-sealed spaces and that the race which does not rotate relative to the radial load or forces is provided in the region of one half of its circumference or periphery with channels for supplying oil under pressure thereto and in the region of the other half of its circumference with channels for discharging the oil.

In order to accomplish that, the individual cage pockets constitute self-sealed spaces, it is not only necessary that the radial thickness of the end rings of the cage which connect the straps or rings at their ends with one another is so proportioned relative to the diameters of the race paths of the rollers, that gap seals result in these locations, but it is also necessary that the cage straps or rungs which border the pockets are of the same radial thickness, so that also in the direction of the circumference of the bearing gap seals are formed between the individual cage pockets. It is obvious that the effectiveness of the invention will be correspondingly improved as the seal gaps are made narrower. It has been found that for this purpose the radial thickness of the cage should be at least $\frac{1}{1000}$ to at most $\frac{1}{10}$ smaller than the diameter of the rollers. If in a bearing of this type the race which does not rotate with respect to the radial load to be absorbed is provided with channels for supplying oil under pressure in an area of one half of its circumference and in the area of the other half with channels for discharging the oil, it can be accomplished by supplying oil under pressure to one half of the bearing that the oil builds up a pressure cushion in the individual cage pockets, which then can carry the other race in the manner of a hydrostatic bearing. Depending on the amount of oil pressure it is then possible to reduce more or less the radial load that must be absorbed by the rollers, so that under extreme conditions the rollers are entirely free of any load.

In accordance with a further object of the invention, the construction of such a bearing may suitably be executed in that the pockets of the cage are provided with such expansions with respect to the rollers that the passage of the oil under pressure is possible without resistance in radial direction race path to the other. If such expansions are not provided, then the unexpected or undesirable choking of the oil may result because it is generally endeavored to have the rollers disposed in the cage pockets with very little play or tolerance.

It is still a further object of the invention to form the cage rungs which form the borders for the pockets at the inner and outer cage mantle relative to the pockets in a manner that their cross-section decreases such that between them and between the associated races wedge-shaped spaces are formed that promote the build-up of hydrodynamic lubricating film. By means of this construction of the cage strips or rungs, it is accomplished that the cage centers itself between the race paths whereby it is achieved that the sealing gaps between the cage and the races are of the same width along the entire circumference of the bearing. If that type of centering of the cage were not provided, it would be possible that the cage would engage one race on one side of its circumference so that at the location opposite therefrom a gap of double width would be formed as a result of which the leakage losses would become fourfold. The profiling of the cage rungs is also particularly justified, especially where a bearing is concerned which rotates at a very high number of rotations. As soon as a certain number of rotations is attained, the force effected upon the shaft to be journalled by the hydrodynamically built-up film of lubricant can become so great that the cage can transfer the entire bearing load as a "floating bearing sleeve."

However, the invention is not limited to radial roller bearings where the rollers are accommodated in the pockets of a cage. It is possible, rather, to apply it successfully to such bearings where the rollers are disposed directly adjacent to one another. In accordance with the invention the race paths in such bearings are sealed relative to one another by means of edges or rims which adapt themselves completely to the ends of the rollers, while every second roller has a longitudinal cross section which with respect to that of the remaining rollers has a smaller surface area, and besides, as is the case with the bearing having the cage the race path that does not rotate with respect to the radial load to be absorbed is provided in the region of one half of its circumference with channels for the supply of oil under pressure and in the region of the other half of its circumference with channels for the discharge of oil.

While in the bearing described above, where the rollers are accommodated in a cage, the spaces in which the hydrostatic pressure is built up are defined by the cage pockets, these spaces in the bearing last described are bordered or defined by the roller per se. In such a bearing the rollers are on the one hand in contact with the inner as well as with the outer race, whereby the individual spaces or chambers are sealed circumferentially of the bearing. On the other hand, however, the races are provided with borders, edges or flanges which adapt themselves entirely to the rollers and which at the same time seal the race paths relative to one another. By means of them, sealing of these pressure spaces or chambers is also obtained in the axial direction of the bearing. In order to make possible the passage of the oil under pressure from one race path to the other it is necessary in accordance with the invention to provide each second roller with such a longitudinal cross section that it has a smaller surface with respect to the remaining rollers. In this manner channels for the passage of the oil under pressure are provided. The operation of the bearing is otherwise the same as with the bearing with the cage described above. Also here oil under pressure is supplied along one half of the periphery of the bearing which builds up pressure cushions in the sealed spaces described, while in the oppositely disposed half of the periphery of the bearing which is not loaded the oil is carried off.

A suitable form of bearing construction of this type is obtained in that cylindrical rollers having plain or flat end surfaces roll between cylindrical running or race paths that are provided at both ends with plain borders, where the borders or edges define gap seals between the two running paths.

A particularly simple form of construction for the second roller bodies described above which are intended to define the lubricant passages or channels is obtained by providing the rollers with end surfaces of spherical shape.

Further details and advantages of the invention will become apparent from the following description of the different embodiments illustrated in the drawings and in which FIG. 1 is a longitudinal cross-section of a bearing in accordance with the invention having a cage, FIG. 2 is a section taken along line II—II in FIG. 1, FIG. 3 is a top view of the cage in accordance with FIG. 1 laid out in a plane, FIG. 4 is a schematic illustration showing the distribution of the hydraulic pressure in the bearing, FIG. 5 is cross-section of a portion of the bearing in accordance with FIG. 1 but with a different type of cage construction, FIG. 6 is a longitudinal cross-section through a bearing in accordance with the invention without a cage, and FIG. 7 is a partial section of a bearing in accordance with FIG. 6 laid out in a plane.

The bearing illustrated in FIGS. 1 and 2 comprises the outer race 1, the inner race 2 and the rollers 3 that roll between them and which are disposed in the cage between them. The cage 4 has such a radial thickness that it enters between the races 1 and 2 with a tolerance or play that is so small that sealed spaces are formed. The sealing of these spaces is obtained by the gap seals that result from the small tolerances between the cage 4 and the races 1 and 2. Retaining or check disks or rings 5 may be subsequently inserted in the outer race ring which prevent the cage from sliding out of the cage in axial direction. In the embodiment illustrated the periphery of the outer race 1 is provided with six bores 6 and 7 that are equally distributed along the circumference. Bores 6 are arranged in the lower half of the race ring and bores 7 in the upper half of the ring. If it is assumed that a shaft to be journalled in this bearing is loaded by a radial force applied vertically downwardly, oil under pressure is introduced through the bores 6 from below which can be conducted away by bores 7. The feeding of oil under pressure through bores 6 builds up a pressure in the individual pockets of the cage in which the rollers 3 are housed, which is capable to support or carry the inner race ring entirely or partly, whereby the load on the rollers 3 in the lower loaded part of the bearing is partly or completely eliminated.

In order that the build up of pressure may take place in the pockets for the rollers it may be suitable as shown in FIG. 3, to provide expansions 19 in certain parts of the pockets in which the rollers are received, which permit the passage of the oil under pressure.

FIG. 4 illustrates schematically the distribution of the hydraulic pressure between the two race rings where the location of the bores 6 and 7 is likewise illustrated schematically. It can be seen from FIG. 4 that the hydraulic pressure carrying the inner race 2 is in fact built up merely in the lower half of the bearing, which has applied to it the radial forces to be absorbed by the bearing. By suitable choice of the number of bores, their distribution circumferentially of the bearing and the magnitude of the pressure of the oil supplied, it is possible to obtain practically any conceivable distribution of pressure between the two race rings and thus the bearing can be adapted to any particular practical requirements.

As shown in FIG. 5 by the partial cross-section of such a bearing, the bridges or rungs 8 of the cage at the inner and outer surfaces of the rungs can be profiled to decline in the direction of the rollers that between them and the races 1 and 2 wedge shaped spaces are formed which favor the build up of a hydrodynamic film of lubricant. These wedge shaped spaces are identified at 9 at the outer circumference of the cages and at 10 in the bore of the cage. By virtue of these structural forms it is possible to make the cage self-centering when it is pushed away from the race by the wedges of lubricant that are developed, and then, when it operates at a high number of revolutions, to accomplish that the film of lubricant being formed provides an additional relief for the rollers because then the cage practically assumes the functions of a sliding bearing in the manner of a "floating sleeve" and is capable of taking over a part of the bearing load by virtue of the built up film of lubricant.

FIG. 6 illustrates a different embodiment of a bearing in accordance with the invention. Here the cylindrical rollers 13 which have plain end surfaces roll between the outer race 11 and the inner race 12. The end surfaces of the rollers run opposite the radially extending borders or flanges 14. The end surfaces of the rollers 13 run against the radially directed borders of the race 11. The inner diameter of the borders 14 is so proportioned with respect to the outer diameter of the race ring 12, that a gap seal 15 is formed. Also with this bearing as with the bearing in accordance with FIGURES 1 and 2 bores 6, 7 are provided circumferentially of the outer race 11 which serve for the same purpose as described above. The oil under pressure introduced through bores 6 performs the same function here as already described above. In order that the oil can actually pass between the roller 13 and thus support the inner race 12 it is necessary to provide possibilities for the passage of the oil between the rollers 13. For this purpose one may proceed as shown in FIG. 7 which illustrates a partial section of the bearing laid out in a plane. It can be seen that between each two rollers 13 with flat end surfaces differently formed rollers 16 are alternately disposed which have spherical end surfaces 17. This form of construction results in passages or channels 18 for the oil under pressure.

The invention is not limited to embodiments of bearings having cylindrical rollers as embodiments of bearings with all known forms of rollers are conceivable. In any event it is merely necessary to provide for self sealed subdivided spaces between the two roller races in which pressure cushions are formed as oil under pressure is introduced therein.

Having now described my invention with reference to the embodiments illustrated in the drawings, I do not wish to be limited thereto, but what I desire to protect by Letters Patent of the United States is set forth in the appended claims.

I claim:

1. Radial roller bearing comprising a pair of races, a cage defining a plurality of pockets disposed between said races and a plurality of rollers disposed in said pockets, said cage being received between said races with a minimum amount of tolerance between the cage and the races, individual said race pockets defining self sealing spaces and one said race which does not rotate relative to the radial load to be absorbed being provided along one part of its circumference with at least one passage for supplying oil under pressure to said pockets and along another part of its circumference with at least one passage for discharging the oil.

2. Radial roller bearing comprising a pair of races, a plurality of rollers disposed adjacent to one another intermediate said races, one said race having radial flanges extending endwise of said rollers defining seals therewith, each alternate roller having a longitudinal cross section of smaller cross-sectional area than the remaining rollers and one said race being stationary relative to the radial load carried by said bearing and having at least one passage along one part of its circumference for supplying oil under pressure to said bearing and rollers and having at least one passage along another part of its circumference for the discharge of the oil.

3. Radial roller bearing in accordance with claim 1, wherein said cage defines pockets in which said rollers are received and where said pockets have expanded portions permitting the passage of oil under pressure therethrough in radial direction from one said race to the other said race.

4. Radial roller bearing in accordance with claim 1, wherein said cage comprises outer annular portions and rungs extending therebetween defining pockets for receiving said rollers, said rungs at the inner and outer periphery of said cage being profiled in a manner to decline in thickness inwardly toward one another, thereby defining wedge-shaped spaces between said rungs and the adjacent race paths permitting the build-up of hydrodynamic films of lubricant.

5. Radial roller bearing in accordance with claim 2, where said remaining rollers are provided with plain end surfaces and said races present cylindrical race paths bordered at both ends by said flanges, and said flanges define sealing gaps between the two race paths.

6. Radial roller bearing in accordance with claim 5 where each said alternate roller is provided with spherical end surfaces adjacent said flanges.

References Cited

UNITED STATES PATENTS 2,747,945  5/1956  Fulton _____ 308—187 X

FOREIGN PATENTS 1,179,305  12/1958  France.

EDGAR W. GEOGHEGAN, *Primary Examiner.*

CARROLL B. DORITY, *Assistant Examiner.*